United States Patent [19]
Bedol

[11] Patent Number: 5,093,760
[45] Date of Patent: Mar. 3, 1992

[54] CALCULATOR HAVING A THIN RESILIENT CLIP DISPOSED ABOUT THE OUTER PERIPHERY

[76] Inventor: Mark A. Bedol, 6980 Fabriano Pl., Rancho Cucamonga, Calif. 91701

[21] Appl. No.: 640,285

[22] Filed: Jan. 11, 1991

[51] Int. Cl.$^5$ .................. H05K 5/00; G06F 1/00; B42D 9/00
[52] U.S. Cl. .................. 361/392; 361/380; D19/34; 364/705.01; 281/42; 116/237; 24/67.9; D18/7
[58] Field of Search ............ D10/71; D19/34; D18/6, D18/7, 11; 364/705.01, 705.02, 705.03, 705.06, 708; 281/42; 116/236, 237; 24/30.5 S, 67.9, 563; 206/305; 361/380, 392, 393, 394, 395; 235/89 R

[56] References Cited

U.S. PATENT DOCUMENTS

| | | | |
|---|---|---|---|
| D. 245,109 | 7/1977 | Yoshioka | D18/7 |
| D. 253,045 | 10/1979 | Rizer | D10/71 X |
| D. 260,005 | 7/1981 | Sandfield | D10/71 |
| D. 283,515 | 4/1986 | Li | D10/71 X |
| D. 305,036 | 12/1989 | Voetsch | D19/34 |
| 2,300,216 | 10/1942 | Grodsky et al. | 116/237 |
| 3,937,939 | 2/1976 | Frenkel | 364/705.03 X |
| 4,075,702 | 2/1978 | Davis | 364/705.02 |
| 4,224,675 | 9/1980 | Pinkerman | 364/705.02 |
| 4,404,643 | 9/1983 | Ojima et al. | 364/705.03 |
| 4,468,841 | 9/1984 | Herington | 364/705.01 X |
| 4,768,648 | 9/1988 | Glass | 206/38 |
| 4,839,833 | 6/1989 | Parhiskari | 364/705.01 X |
| 4,914,791 | 4/1990 | Lorber | 24/67.9 |

FOREIGN PATENT DOCUMENTS 57-158501 9/1982 Japan .................. 364/705.1

*Primary Examiner*—Leo P. Picard
*Assistant Examiner*—Michael W. Phillips

[57] ABSTRACT

A clip-on calculator assembly comprising a thin calculator housing containing a calculator and a thin resilient clip disposed about the outer periphery of the calculator housing. The clip is integrally connected to a portion of the calculator housing. Spaces are formed between the outer periphery of the housing and the resilient clip for allowing paper or the like to be positioned between the outer periphery and the resilient clip, thereby clipping the same to the calculator.

12 Claims, 2 Drawing Sheets

CALCULATOR HAVING A THIN RESILIENT CLIP DISPOSED ABOUT THE OUTER PERIPHERY

BACKGROUND OF THE INVENTION

1. Field of the Invention

The present invention relates to electronic calculators and more particularly to a thin electronic calculator which includes an integral clip for the attachment thereof to sheets of paper, or the like.

2. Description of Related Art

The development of thin, card-type portable electronic calculators, although a convenience in terms of space-savings, has resulted in a greater possibility of such calculators getting lost due to their small thicknesses. Generally, to help alleviate this problem (and a problem with breakage) the calculator is housed in some type of a case.

For example, U.S. Pat. No. 4,768,648, issued to L. C. Glass, entitled "CALCULATOR MONEY CLIP", discloses a small electronic calculator with a case and a resilient clip. The clip is attached to the back of the calculator case.

U.S. Pat. No. 4,075,702, issued to D. C. Davies, entitled "ELECTRONIC CALCULATING APPARATUS AND WALLET ENCLOSURE", discloses an enclosure having a pair of foldable flap members in which one of the flap members is adapted for supporting the electronic components of the calculator and the other flap member is adapted for folding over in facing relationship with the first. The facing flap member is adapted for carrying a note pad, blank checks, credit cards, or the like.

Use of a case or enclosure results in the added consumption of space. This controverts the advantage of having such a thin calculator.

SUMMARY OF THE INVENTION

In view of the foregoing, a principal object of the present invention is to minimize misplacement of an electronic calculator.

Another object of the present invention is to provide convenient storage of such a calculator in a manner which minimizes storage space.

These and other objects are achieved by the present invention which is a clip-on calculator assembly, which comprises, in its broadest aspects, a thin calculator housing containing a calculator; and, a thin resilient clip disposed about the outer periphery of the calculator housing. The clip is integrally connected to a portion of the calculator housing. Spaces are formed between the outer periphery and the resilient clip for allowing paper or the like to be positioned between the outer periphery and the resilient clip, thereby clipping the same to the calculator.

The clip is preferably molded integrally with an upper end of the calculator housing, spaces being formed adjacent side edges and a bottom edge of the calculator housing. As such, paper is insertable in these formed spaces and fits snugly therewithin. The upper end of the calculator assembly extends above the upper edge of the paper. Thus, the clip-on calculator may be conveniently used as a page marker for date books, checkbooks, etc. It is positioned beyond the edge of the paper with which it is engaged with thus making it less easily lost.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures of the drawings are designated by the same reference characters.

DETAILED DESCRIPTION OF THE INVENTION

Figures 1, 2:
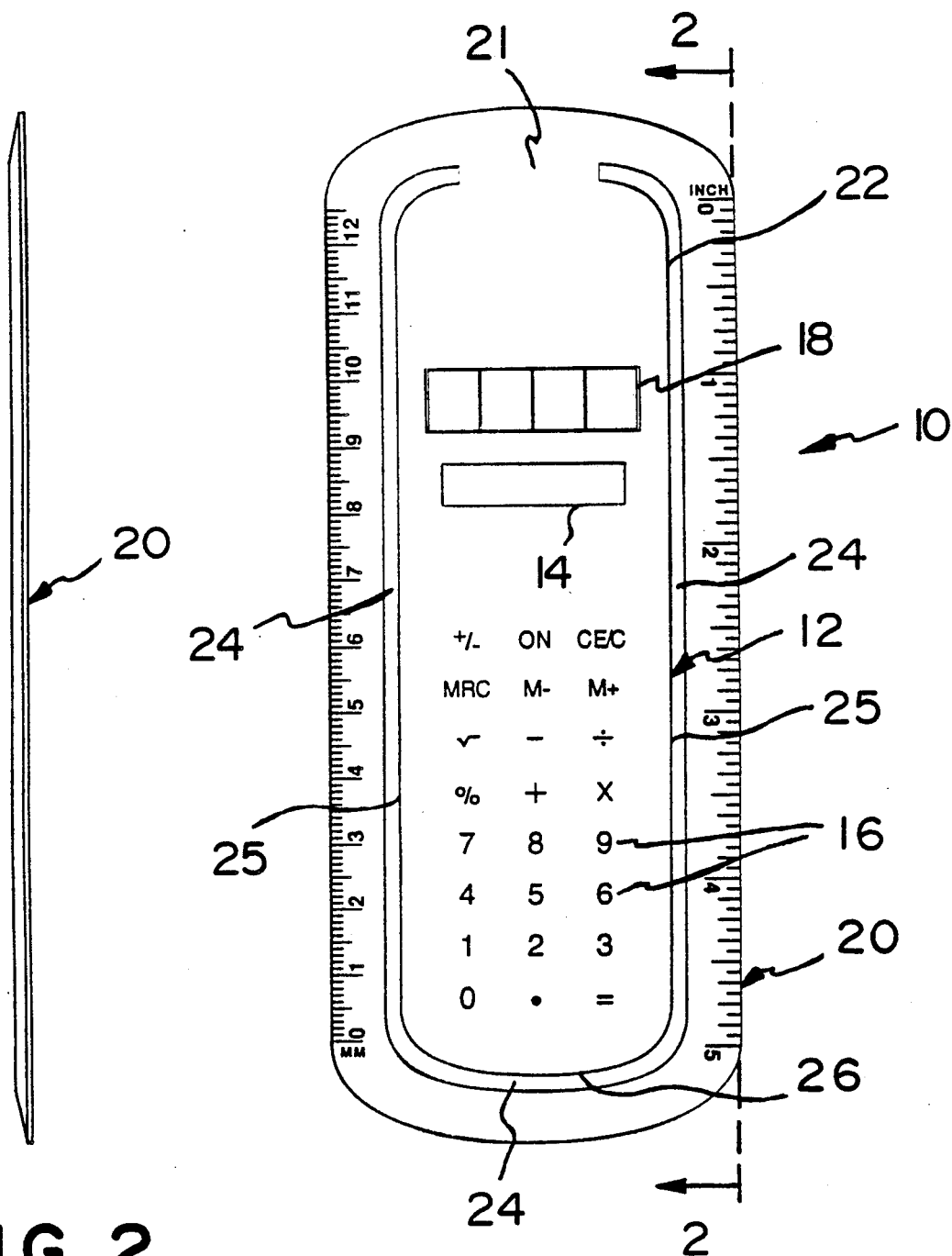
FIG. 1 is a front view of the clip-on calculator of the present invention.
FIG. 2 is a side view of the calculator of FIG. 1, taken along line 2—2 of FIG. 1.

Referring to the drawings and the characters of reference marked thereon, FIG. 1 illustrates the clip-on calculator assembly of the present invention, designated generally as 10. A thin calculator housing 12 contains the necessary electronic components, etc. for a calculator such as a display 14, and numbers 16. The calculator may be of the solar powered type, as shown by power cells 18, for purposes of illustration and not limitation.

Calculator housing 12 is preferably formed of a thin rigid plastic material. It has an overall thickness in a range between 2/32 inch and 5/32 inch thick, preferably approx. 3/32 inch. The back surface of the calculator housing 12 is preferably reinforced with a slightly increased thickness of plastic.

A thin resilient clip 20 is disposed about the outer periphery 22 of the calculator housing 12. In this preferred embodiment, the calculator housing 12 and the resilient clip 20 are connected at an upper end 21 of the calculator assembly 10, the clip forming a U-shape. Spaces 24 are formed adjacent the entirety of side edges 25 and a bottom edge 26 of the calculator housing 12, for allowing paper or the like to be positioned between the outer periphery 22 and the resilient clip 20, thereby clipping the paper to the calculator assembly 10.

The calculator assembly 10 is preferably a one-piece molded plastic unit, the resilient clip 20 having approximately the same thickness as the calculator housing 12. A side view of calculator assembly 10 is illustrated in FIG. 2. As illustrated, the edges of the front surface of the clip 20 are beveled to allow paper to curl around the clip easier and enable the calculator 10 to sit flatter.

Figure 3:
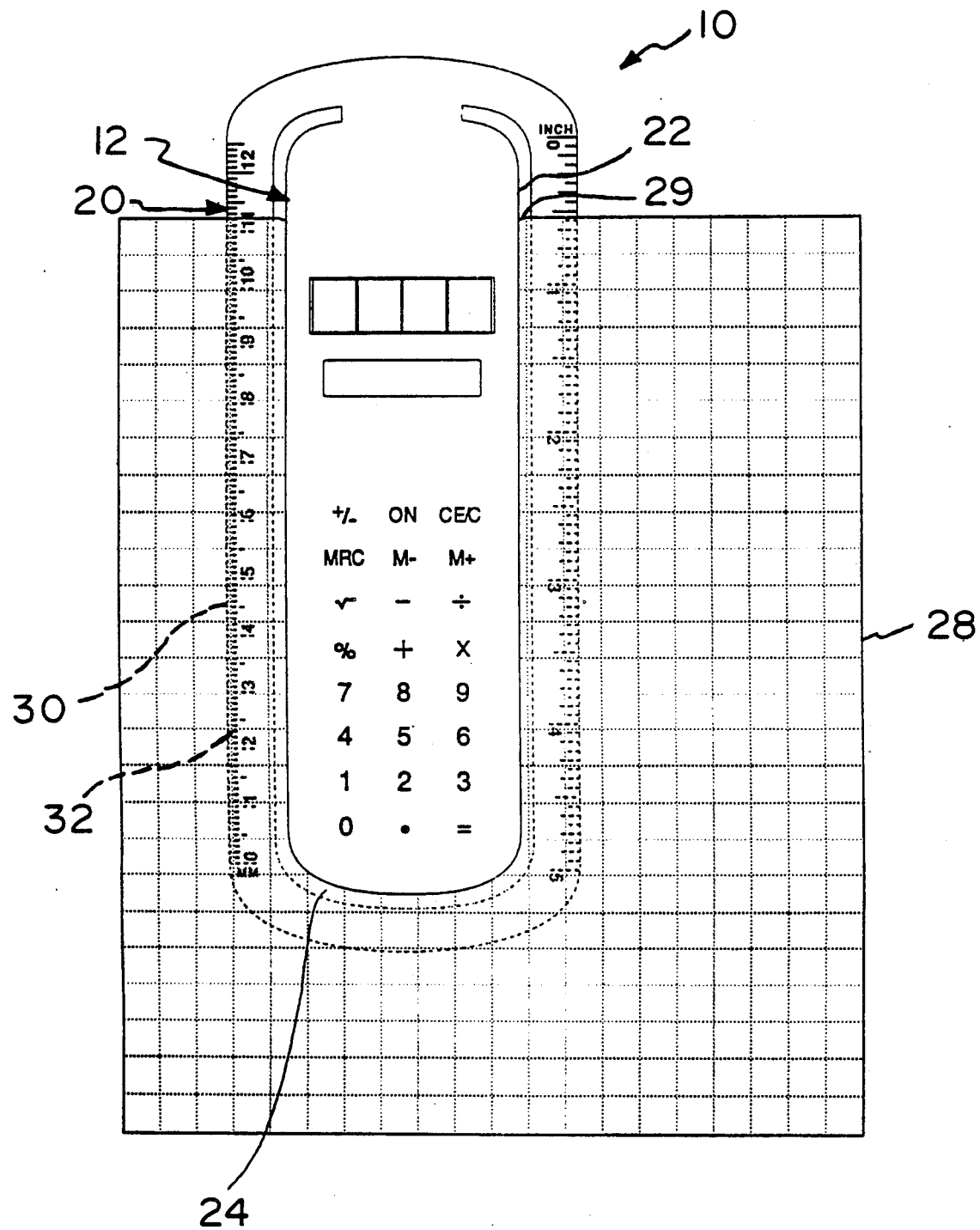
FIG. 3 illustrates the clip-on calculator of the present invention with a sheet of paper held between the calculator housing and the clip.

FIG. 3 illustrates the calculator assembly 10 in use. A sheet of paper 28 is shown positioned or slid within the spaces 24 formed between the outer periphery 22 of the calculator housing 12 and the resilient clip 20. The paper 28 curls slightly, as shown at numeral designation 29 to allow the calculator assembly 10 to maintain its substantially planar alignment. At the same time, the clip is somewhat flexible to accommodate the paper in a similar manner as a paper clip. The upper end of the calculator assembly 10 extends above the upper edge of the paper. Thus, the sensitive main portion of the calculator assembly 10, which contains the electronics, etc., is protected by, for example, pages in a book. The upper portion is maintained in a position where it may be easily seen.

The clip preferably includes straight outer side surfaces 30 having spaced markings 32 thereon for use as rulers.

Obviously, many modifications and variations of the present invention are possible in light of the above teachings. It is therefore to be understood that, within the scope of the appended claims, the invention may be practiced otherwise than as specifically described. For example, although the calculator assembly has been described as having the clip connected at the upper end of the calculator housing it may be located at other portions instead, such as one of the sides or the bottom of the calculator housing.

What is claimed and desired to be secured by Letters Patent of the United States is:

1. A clip-on calculator assembly, comprising:
   a) a thin calculator housing containing a calculator; and,
   b) a thin resilient clip disposed about the outer periphery of said calculator housing, said clip being integrally connected to a portion of said calculator housing, spaces formed between said outer periphery and said resilient clip for allowing paper or the like to be positioned between said outer periphery and said resilient clip, thereby allowing clipping of paper or the like to said calculator housing.

2. The clip-on calculator assembly of claim 1, wherein said calculator housing and said resilient clip are connected at an upper end of said calculator, said spaces being formed adjacent side edges and a lower edge of said calculator housing, allowing or the like to be positioned between said calculator housing and said resilient clip.

3. The clip-on calculator assembly of claim 2, wherein said resilient clip is substantially U-shaped.

4. The clip-on calculator assembly of claim 3, wherein said calculator housing and said resilient clip are of a rigid plastic.

5. The clip-on calculator assembly of claim 4, wherein said calculator housing and said clip are disposed on the same plane in an un-clipped position.

6. The clip-on calculator assembly of claim 5, wherein said calculator housing and said clip each have a thickness in the range of between 3/32 and 5/32 inches.

7. The clip-on calculator assembly of claim 6, wherein said clip includes straight outer side surfaces having spaced markings thereon for use as rulers.

8. A clip-on calculator assembly, comprising:
   a) a thin calculator housing having two side edges, a lower edge and an upper end, said calculator housing containing a calculator; and,
   b) a thin resilient clip disposed about the outer periphery of said calculator housing, said clip being integrally connected to said upper end of said calculator housing, said clip and said calculator housing being of a one-piece molded structure, elongated spaces formed between said side edges and said clip and between said lower edge and said clip for allowing paper or the like to be positioned between said calculator housing and said resilient clip, thereby allowing clipping of paper or the like to said calculator housing.

9. The clip-on calculator assembly of claim 8, wherein said calculator housing and said resilient clip are of a rigid plastic.

10. The clip-on calculator assembly of claim 9, wherein said calculator housing and said clip are disposed on the same plane in an un-clipped position.

11. The clip-on calculator assembly of claim 10, wherein said calculator housing and said clip each have a thickness in the range of between 3/32 and 5/32 inches.

12. The clip-on calculator assembly of claim 11, wherein said clip includes straight outer side surfaces having spaced markings thereon for use as rulers.

* * * * *